United States Patent
He et al.

(10) Patent No.: US 12,238,551 B2
(45) Date of Patent: Feb. 25, 2025

(54) NETWORK OPERATIONS TO REDUCE PDCCH MONITORING

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 666 days.

(21) Appl. No.: 17/593,583

(22) PCT Filed: Oct. 5, 2020

(86) PCT No.: PCT/CN2020/119809
§ 371 (c)(1),
(2) Date: Sep. 21, 2021

(87) PCT Pub. No.: WO2022/073149
PCT Pub. Date: Apr. 14, 2022

(65) Prior Publication Data
US 2022/0312239 A1    Sep. 29, 2022

(51) Int. Cl.
*H04W 24/08*    (2009.01)
*H04L 1/00*    (2006.01)
(Continued)

(52) U.S. Cl.
CPC .......... *H04W 24/08* (2013.01); *H04L 1/0038* (2013.01); *H04W 72/0446* (2013.01); *H04W 72/23* (2023.01); *H04W 72/51* (2023.01)

(58) Field of Classification Search
CPC . H04W 24/08; H04W 72/0446; H04W 72/23; H04W 72/51; H04L 1/0038; H04L 5/0096; H04L 5/0053; Y02D 30/70
See application file for complete search history.

(56) References Cited

U.S. PATENT DOCUMENTS

| | | | |
|---|---|---|---|
| 2009/0238091 A1* | 9/2009 | Kim | H04L 27/2656 370/252 |
| 2013/0194956 A1 | 8/2013 | Sartori et al. | |

(Continued)

FOREIGN PATENT DOCUMENTS

| | | |
|---|---|---|
| CN | 106416386 | 2/2017 |
| CN | 106549733 | 3/2017 |

(Continued)

OTHER PUBLICATIONS

Intel Corporation, "Search spaces for sPDCCH"; 3GPP TSG-RAN WG1 #90bis; R1-1717322; Oct. 13, 2017; 4 sheets.

(Continued)

*Primary Examiner* — Charles N Appiah
*Assistant Examiner* — Frank E Donado
(74) *Attorney, Agent, or Firm* — Fay Kaplun & Marcin, LLP (57) ABSTRACT

A base station configures a user equipment (UE) to monitor a Physical Downlink Control Channel (PDCCH). The base station receives, from the UE, a reduced PDCCH monitoring capability for at least one group of search space sets (SSS) of a PDCCH, determines a reduced monitoring capability (MO) configuration for the UE based on the reported (Continued)

Signaling Diagram 400 reduced PDCCH monitoring capability and transmits the reduced MO configuration to the UE.

16 Claims, 6 Drawing Sheets

(51) Int. Cl.
*H04W 72/0446* (2023.01)
*H04W 72/23* (2023.01)
*H04W 72/51* (2023.01)

(56) References Cited

U.S. PATENT DOCUMENTS

| | | | |
|---|---|---|---|
| 2019/0014567 A1* | 1/2019 | Saito | H04L 5/0094 |
| 2019/0090299 A1* | 3/2019 | Ang | H04W 52/0229 |
| 2019/0150073 A1 | 5/2019 | Tiirola et al. | |
| 2019/0306737 A1* | 10/2019 | Kwak | H04W 24/08 |
| 2020/0244507 A1 | 7/2020 | Pan et al. | |
| 2020/0260304 A1* | 8/2020 | Zhou | H04W 72/23 |
| 2020/0314747 A1* | 10/2020 | Zhou | H04W 52/143 |
| 2020/0329389 A1* | 10/2020 | Hosseini | H04W 8/24 |
| 2022/0014307 A1 | 1/2022 | Boroujen et al. | |
| 2022/0053479 A1 | 2/2022 | Kim et al. | |
| 2022/0201515 A1* | 6/2022 | Chatterjee | H04L 1/0038 |
| 2023/0047726 A1 | 2/2023 | Xu et al. | |
| 2023/0199751 A1 | 6/2023 | Huang et al. | |
| 2023/0276268 A1 | 8/2023 | Zhou et al. | |

FOREIGN PATENT DOCUMENTS

| | | | |
|---|---|---|---|
| CN | 110267330 | 9/2019 | |
| CN | 110313210 | 10/2019 | |
| CN | 110351739 | 10/2019 | |
| CN | 110740008 | 1/2020 | |
| CN | 110740514 | 1/2020 | |
| CN | 110831217 | 2/2020 | |
| CN | 110999452 | 4/2020 | |
| CN | 111247841 | 6/2020 | |
| CN | 113950151 | 1/2022 | |
| CN | 115278843 A * | 11/2022 | H04L 5/0032 |
| CN | 115380484 | 11/2022 | |
| CN | 112106395 | 9/2023 | |
| WO | 2018/127802 | 7/2018 | |
| WO | 2020/032774 | 2/2020 | |
| WO | 2020/072963 | 4/2020 | |
| WO | 2021/206446 | 10/2021 | |

OTHER PUBLICATIONS

Huawei et al., "Correction on SPDCCH monitoring of an MBSFN subframe"; 3GPP TSG RAN WG1 Meeting #102-e; R1-2006924; Aug. 28, 2020; 2 sheets.

NEC, "Reduced PDCCH monitoring for Redcap NR devices"; 3GPP TSG RAN WG1 #102-e; R1-2005778; Aug. 17, 2020; 4 sheets.

Moderator (Apple Inc.), "Feature lead summary #3 on reduced PDCCH monitoring", 3GPP TSG-RAN WG1 #102-e, R1-2007284, Aug. 27, 2020, 45 sheets.

NEC, "View on reduced PDCCH monitoring for NR devices"; 3GPP TSG RAN WG1 #101-e, R1-2003711, May 15, 2020, 2 sheets.

NEC, "Reduced PDCCH monitoring for Redcap NR devices"; 3GPP TSG RAN WG1 #102-e, R1-2005778, Aug. 8, 2020, 4 sheets.

Huawei et al., "Coreset configuration and search space design", 3GPP TSG RAN WGI Meeting AH NR#3, R1-1715395, Sep. 11, 2017, 10 sheets.

Ericsson, "Summary of 7.1.3.1 (DCI contents and formats)", TSG-RAN WG1 #94, R1-1809701, Aug. 21, 2018, 19 sheets.

CATT, "Remaining issues on PDCCH search space", 3GPP TSG RAN WG1 Meeting #92, R1-1801728, Feb. 17, 2018, 4 sheets.

Lenovo et al., "On coverage enhancement for RedCap", 3GPP TSG RAN WG1 Meeting #10,1 R1-2003829, May 15, 2020, 5 sheets.

* cited by examiner

| X-bit | |
|---|---|
| '00' | No switching |
| '01' | Switching to another PDCCH profile or another group of PDCCH configurations. |
| "10" | Skipping K1 MO monitoring occasions without switching PDCCH monitoring profile |
| "11" | Skipping K2 MO monitoring occasions without switching PDCCH monitoring profile |

NETWORK OPERATIONS TO REDUCE PDCCH MONITORING

BACKGROUND INFORMATION

The physical downlink control channel (PDCCH) search space refers to an area in the downlink resource grid where the PDCCH may be carried. For a user equipment (UE) to decode the PDCCH, the UE needs to know the location of the PDCCH (Control Channel Element (CCE) aggregation level and each CCE index), structure, scrambling code, etc. However, each PDCCH supports multiple DCI formats and aggregation levels. The UE is not informed of which DCI format or aggregation level is used, and thus needs to perform blind decoding throughout the search space to find the transmitted downlink control information (DCI).

Each blind decoding attempt is a processing burden for the UE, and a PDCCH monitoring configuration allowing for a potentially high number of blind decoding attempts may detrimentally affect the UE battery performance. Reduced capability (Redcap) devices, such as industrial wireless sensors, video surveillance, and wearables devices, typically have a reduced battery life relative to devices supporting normal capabilities. Thus, a PDCCH monitoring configuration allowing for a high number of blind decoding attempts may be particularly detrimental to the battery performance of Redcap devices.

SUMMARY

Some exemplary embodiments are related to one or more processors configured to perform operations. The operations include receiving, from a user equipment (UE), a reduced physical downlink control channel (PDCCH) monitoring capability for at least one group of search space sets (SSS) of a PDCCH, determining a reduced monitoring capability (MO) configuration for the UE based on the reported reduced PDCCH monitoring capability and transmitting the reduced MO configuration to the UE.

Other exemplary embodiments are related to a base station having a transceiver configured to connect to a user equipment (UE) and one or more processors communicatively coupled to the transceiver and configured to perform operations. The operations include receiving, from the UE, a reduced physical downlink control channel (PDCCH) monitoring capability for at least one group of search space sets (SSS) of a PDCCH, determining a reduced monitoring capability (MO) configuration for the UE based on the reported reduced PDCCH monitoring capability and transmitting the reduced MO configuration to the UE.

DETAILED DESCRIPTION

The exemplary embodiments may be further understood with reference to the following description and the related appended drawings, wherein like elements are provided with the same reference numerals. The exemplary embodiments describe operations to reduce PDCCH monitoring with smaller blind decodes (BDs) and control channel element (CCE) limits while balancing different relevant aspects, e.g. latency, PDCCH blocking probability, power consumption and scheduling flexibility. The exemplary embodiments also provide a general framework to support adaptation switching between different power consumption profiles of PDCCH monitoring.

Network/Devices

Figure 1:
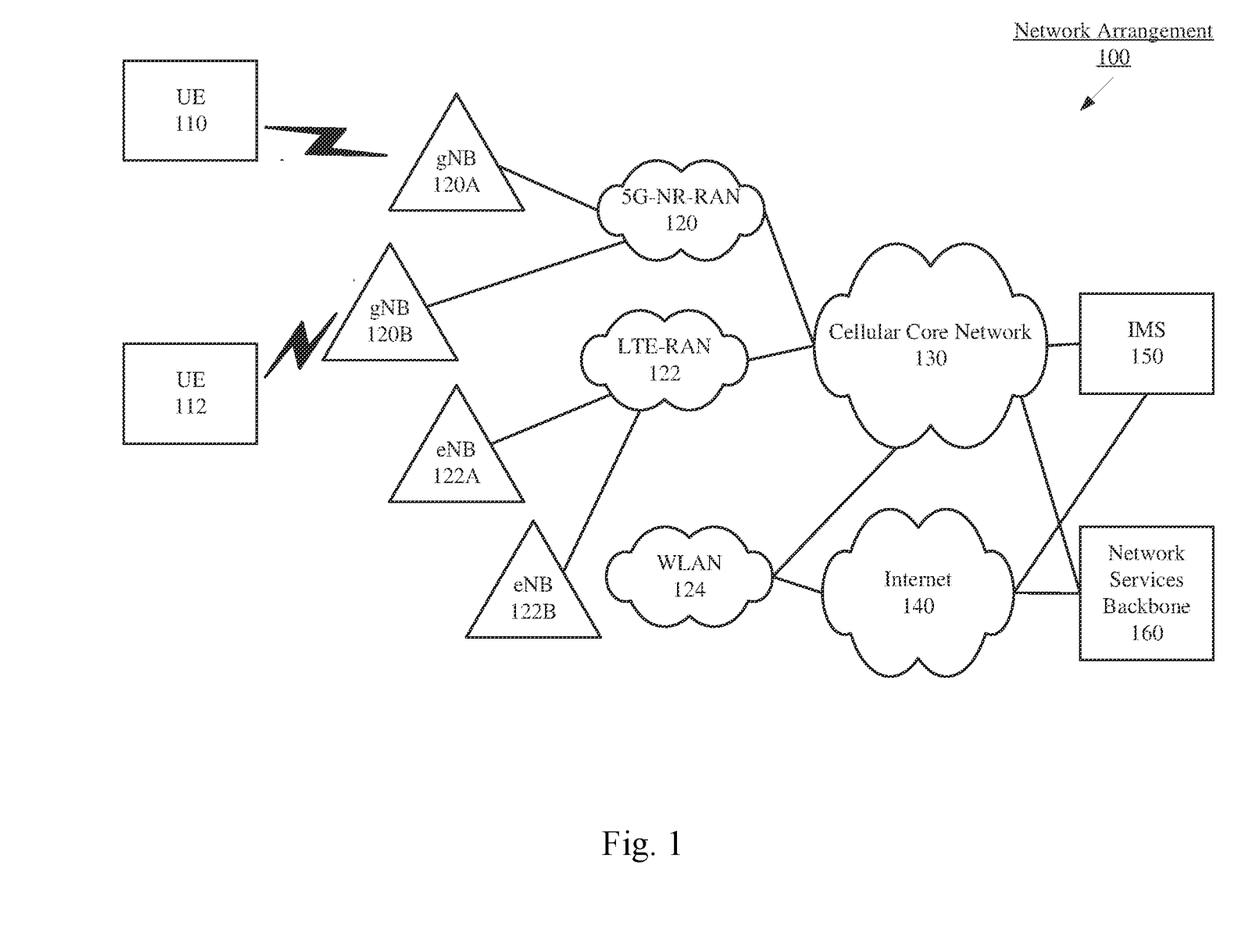
FIG. 1 shows an exemplary network arrangement according to various exemplary embodiments.

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs 110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
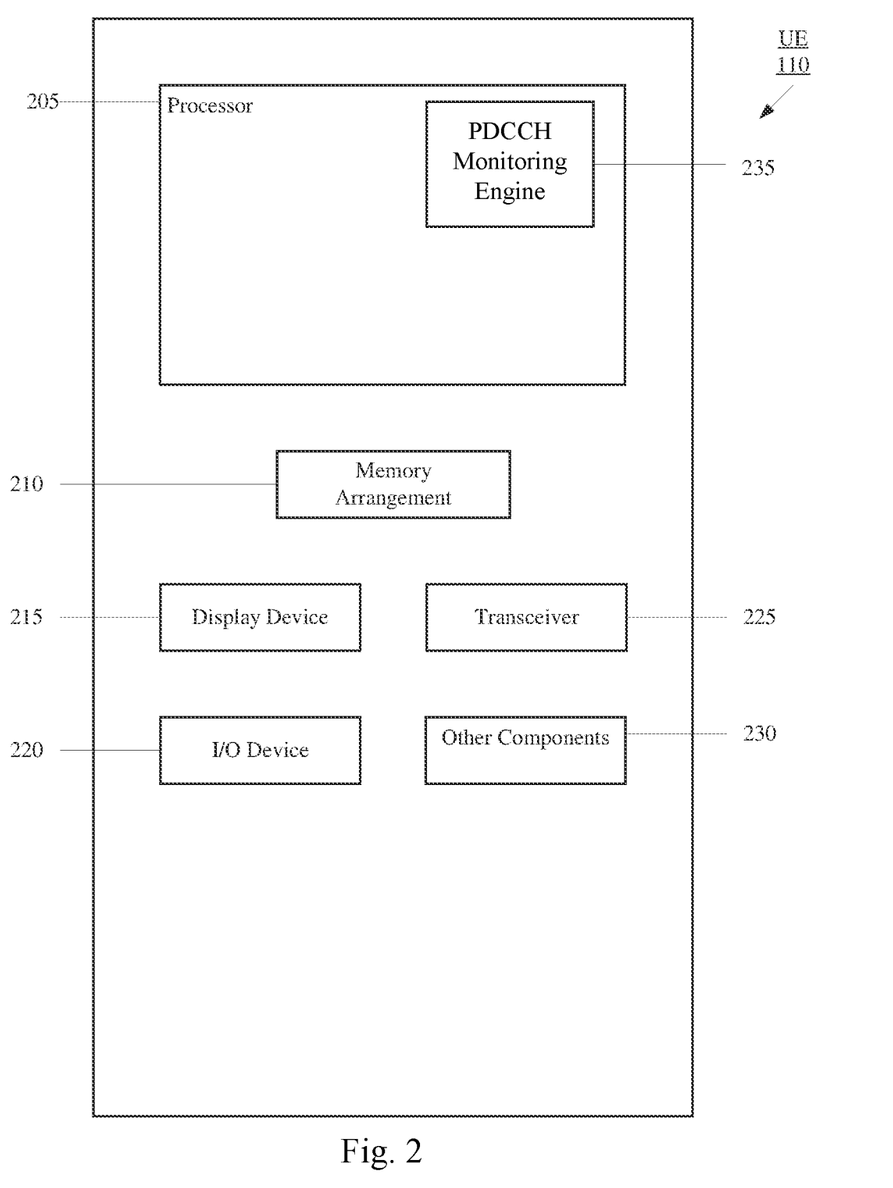
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a PDCCH monitoring engine 235 for performing operations including reporting a reduced PDCCH monitoring capability to the network, receiving a network PDCCH monitoring occasion (MO) configuration from the network, and monitoring the PDCCH based in part on the received configuration, to be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
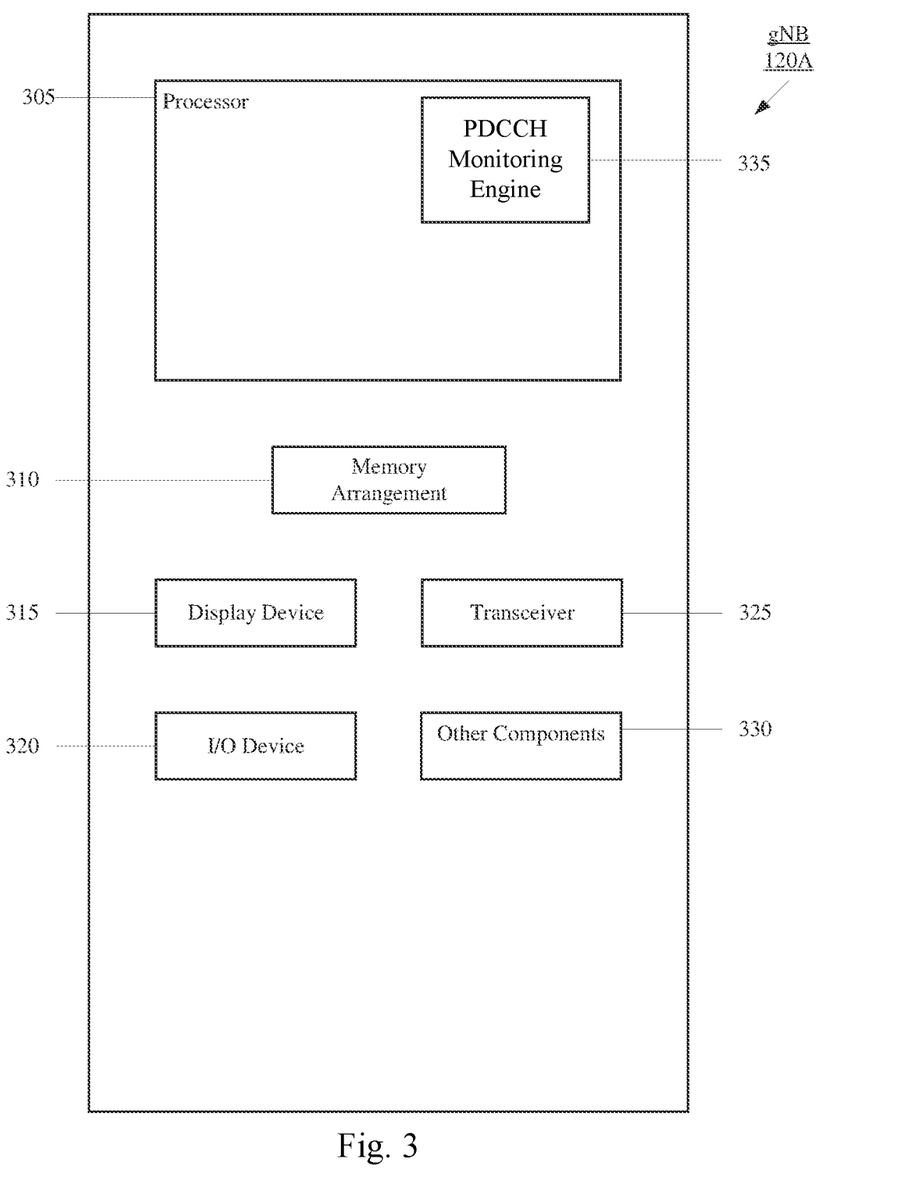
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a PDCCH monitoring engine 335 for performing operations including receiving a UE capability report for a reduced PDCCH monitoring capability, selecting a PDCCH monitoring occasion (MO) configuration for the UE, and configuring the UE with the selected PDCCH MO, to be described in detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

PDCCH Monitoring Reduction

In the RAN 86 meeting, a work item "support of reduced capability NR devices" was approved for studying a UE feature and parameter list for devices with lower end capabilities, relative to Release 16 eMBB and URLLC NR, to serve use cases including industrial wireless sensors, video surveillance, and wearables devices with eMBB and/or URLLC functionality. One design objective aims to improve the battery life performance for reduced capability (Redcap) devices by reducing physical downlink control channel (PDCCH) monitoring, in part by reducing the numbers of blind decodes (BDs) and implementing control channel element (CCE) limits.

The PDCCH search space refers to an area in the downlink resource grid where the PDCCH may be carried. The downlink control channel is transmitted on an aggregation of one or more consecutive control channel elements (CCEs), each CCE comprising multiple resource element groups (REGs), e.g. 6 REGs (72 resource elements (REs)). The number of REs of a control resource set (CORESET) required to carry a PDCCH DIC message is referred to as an aggregation level (AL) and is expressed in terms of CCEs. For example, an aggregation level of 1 refers to 1 CCE. There are five different PDCCH CCE ALs supported in 5G NR (ALs 1, 2, 4 8 and 16) specifying the number of CCEs required to carry the PDCCH DCI message.

The PDCCH search space includes a UE-specific search space and a common (cell-specific) search space for the UE to monitor for potential DCI formats, including, e.g., downlink (DL) grants and uplink (UL) grants. The UE-specific search space is configured for the UE via Radio Resource Control (RRC) signaling and is dedicated to the specific UE, while the common search space is targeted to all or at least a group of UEs in the cell having a RRC connection with the network/gNB. A CCE index is the CCE number at which the PDCCH is allocated. For the UE to decode the PDCCH, the UE needs to know the location of the PDCCH (CCE index), structure, scrambling code, etc. However, the UE is not informed of the exact aggregation level (AL) or DCI format for the PDCCH reception. Instead, it was configured with a set of ALs and a number of DCI formats to ensure scheduling flexibility at the gNB side, and thus the UE needs to perform blind decoding throughout the search space to find the PDCCH data (e.g., DCI).

The exemplary embodiments described herein provide a variety of solutions to reduce PDCCH monitoring with smaller BDs and CCE limits while balancing different relevant aspects, e.g. latency, PDCCH blocking probability, power consumption and scheduling flexibility. The exemplary embodiments also provide a general framework to support adaptation switching between different power consumption profiles of PDCCH monitoring.

Figure 4:
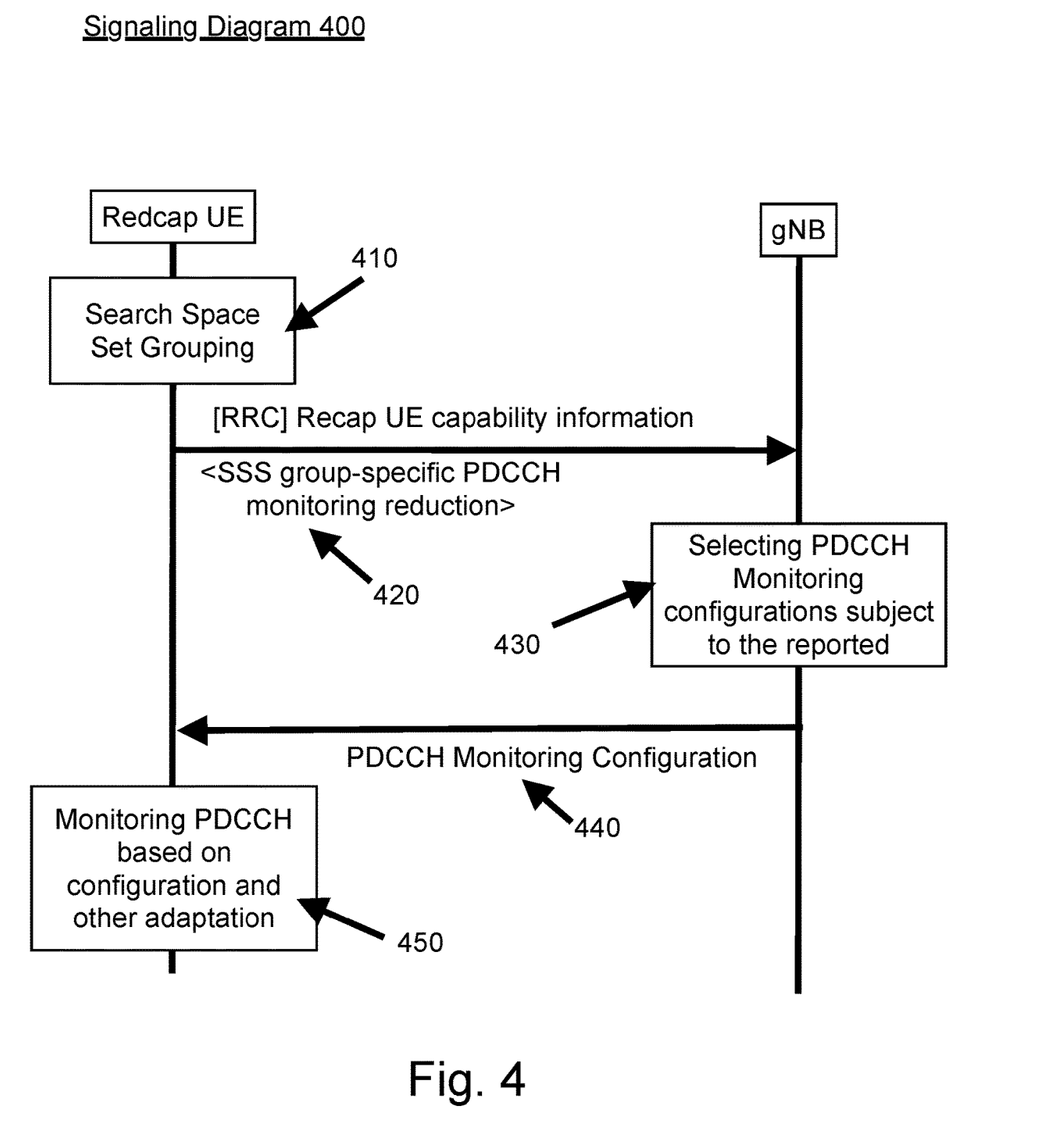
FIG. 4 shows a signaling diagram for a reduced PDCCH monitoring operation according to various exemplary embodiments.

FIG. 4 shows a signaling diagram 400 for a reduced PDCCH monitoring operation. Each of the signaling steps in the signaling diagram 400 will be described in further detail below.

In 410, search space sets (SSS) are divided into two groups based on the associated functionalities. In 420, the UE reports a reduced PDCCH monitoring capability respectively for the different SSS groups. In 430, a gNB selects one from multiple reduced PDCCH monitoring occasion (MO) configurations based on the reported UE capability. In 440, the selected PDCCH MO configuration is configured for the UE. In 450, the UE monitors the PDCCH based on the configuration and other adaptation signaling (including timer-based, L1 signaling based, or a combination thereof).

First, referring to step 410, PDCCH search space sets are grouped based on search space types. A first group (G1) includes a cell-specific or common search space (CSS) comprising Type-0/0A/1/2-PDCCH CSS. A second group (G2) includes a UE-specific search space (USS). In some exemplary embodiments, a Type-3 PDCCH CSS may not be supported by Redcap devices to minimize the power consumption of PDCCH monitoring, and is thus not included in either of the groups G1 or G2. In other exemplary embodiments, the Type-3 CSS may be grouped into G2 with the USS to allow relaxed PDCCH monitoring capability.

Different rules of PDCCH monitoring may be applied depending on the group type of the two search space sets. A scaling factor $\alpha$ may be introduced for one or both of the groups for reducing the blind decoding attempts and/or the number of non-overlapped CCEs. In a first rule, no reduction, or a relatively smaller reduction, of blind decoding (BD) and/or non-overlapped CCEs may be applied for the G1 SS relative to the G2 SS. The motivation for the first rule is primarily so that the Redcap devices can share the scheduled broadcast message, e.g. SIB-x, paging messages, random access response (RAR) messages, etc., with normal-capability eMBB/URLLC devices and therefore reduced system overhead. In a second rule, a reduced number of BDs/non-overlapped CCEs to be used by the UE may be reported respectively for G1 and G2 by a Redcap device as part of UE capability signaling. Alternatively, one or both of the reduced capabilities for G1 and G2 may be hard-encoded in specification and applied for any Redcap device.

Figure 5:
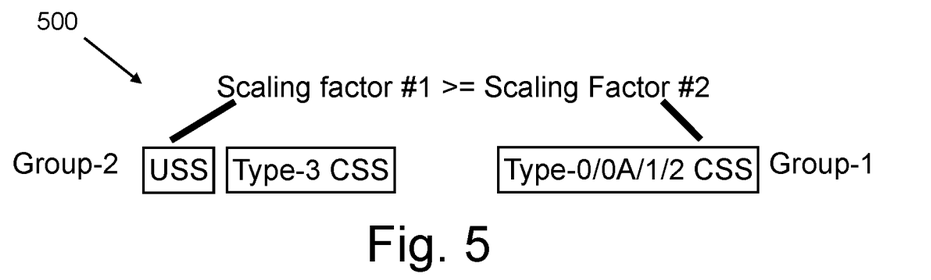
FIG. 5 shows a diagram showing different scaling factors being applied for the first and second search space set (SSS) groups according to various exemplary embodiments.

FIG. 5 shows a diagram 500 showing different scaling factors being applied for the first and second search space set (SSS) groups. As shown in FIG. 5, a first scaling factor $\alpha$ may be applied for BDs and CCE limits to the second SSS group G2 (comprising the USS and, in some embodiments, the Type-3 CSS) and a second scaling factor $\alpha$ for BDs and CCE limits, less than or equal to the first scaling factor $\alpha$, may be applied to the first SSS group G1 (comprising the Type-0/0A/1/2 CSS). As mentioned above, in some embodiments, the scaling factor $\alpha$ for G1 may be 1, e.g., no reduction in BDs or CCEs.

A new information element (IE) pdcch-CandidateReductions-r17 may be used by the UE to report the relaxed PDCCH monitoring capability as part of a Redcap UE capability report. This IE allows the UE to report the max number of BDs on the G2 search space set in a single slot or over a number of slots. In some exemplary embodiments, the number of reduced BDs supported by the UE is determined by the field value $\alpha*X$). The value of 'X' may be determined in different ways. In one design, X is hard-encoded in specification in accordance with $X = M_{PDCCH}^{max,slot,u} - M_{G1,CSS}^{max,slot,u}$, where $M_{PDCCH}^{max,slot,u}$ is the maximum number of PDCCH candidates in a slot or over a number of consecutive slots and $M_{G1,CSS}^{max,slot,u}$ is the maximum number of PDCCH candidates for G1 CSS without reduction for SCS u, e.g. $M_{G1,CSS}^{max,slot,u} = 7$.

The value of $\alpha$ may be signaled by the UE for G2-SSS. In some designs, the value may be reported on a per aggregation level basis to improve utilization of UE baseband processing capability, taking into account mobility information/SNR geometry distribution etc. For example, if the UE is relatively close to the gNB, a lower $\alpha$ value may be used for larger aggregation levels, e.g. 8/16 due to the small likelihood of use for UE closing to the gNB. A set of a values may be predefined and hard-encoded in specification. In one example, $\alpha \in \{0, 0.33, 0.66, 1\}$. This set of values may be commonly applied for both single-slot and multi-slot PDCCH monitoring reduction. In another example, different sets of values may be defined for single-slot and multi-slot PDCCH monitoring reduction. In case of multi-slot PDCCH monitoring reduction, $\alpha \in \{0, 0.50, 1, Y>1\}$. Different Y values may be dependent on the number of slots tom which multi-slots PDCCH monitoring is applied.

Figure 6:
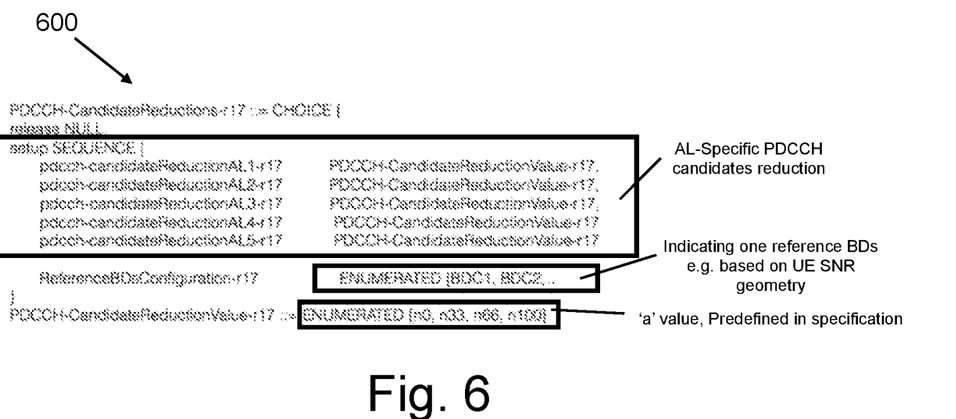
FIG. 6 shows an exemplary ASN.1 signaling for the a value to allow UE capability indication on a per aggregation level (AL) basis according to various exemplary embodiments.

FIG. 6 shows an exemplary ASN.1 signaling 600 for the a value to allow UE capability indication on a per aggregation level (AL) basis, based on a reference blind decoding configuration for each AL. In one design, the reference BD configuration for each AL may be hard-encoded in specification. As one example, the reference BDs for each AL may be <6, 6, 2, 2, 1>. In other designs, more than one reference BD configuration may be hard-encoded in specification. One of these reference BD configurations is then reported as part of UE capability together with the AL-specific '$\alpha$' values.

In general, two PDCCH monitoring profiles may be supported from the system perspective and configured for the Redcap UE (steps 430-440 in FIG. 4). A first monitoring profile is a 'high-power-consumption' profile and the second monitoring profile is a 'low-power consumption' profile. In one example, the Rel-15/16 PDCCH monitoring configuration, without any relaxation, may represent the 'high-power-consumption' profile PDCCH monitoring configuration.

A variety of configurations may be supported to relax PDCCH monitoring for Redcap devices e.g. for the 'low-power consumption' profile. In a first configuration, a maximum number of BDs per slot is reduced relative to Rel-15/16 and the PDCCH monitoring periodicity of k slots ($k \geq 1$). In a second configuration, a maximum number of BDs per slot is reduced or the same as Rel-15/16. However, unlike the first configuration, in the second configuration the PDCCH monitoring periodicity of k slots is larger than one, i.e. k>1, to reduce the burden of PDCCH monitoring. In some designs, the k value may be hard-encoded in specification. Alternatively, a set of values may be predefined and the supported k value is reported by the Redcap UE as part of the UE capability report (step 420 in FIG. 4).

Figure 7:
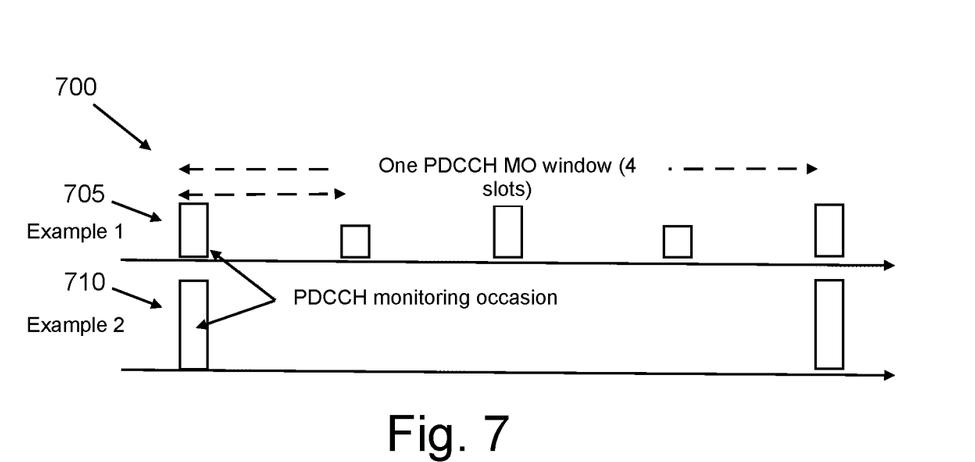
FIG. 7 shows an exemplary diagram for a window-based PDCCH configuration for Redcap devices to reduce PDCCH monitoring according to various exemplary embodiments.

In a third configuration, the network may define a PDCCH monitoring opportunity (MO) window, in which the total number of BDs should be reduced compared to Rel-15/Rel-16 subject to UE capability report. The window configuration may be provided by the gNB by RRC signaling. In addition, the exact MO slot(s) within a window may be indicated using bitmap RRC signaling. Furthermore, different blind decodes (BDs) associated with either different AL or DCI format sizes may be independently configured for each MO within a window, subject to a rule that the total BDs in the window should not exceed the reported UE capability. FIG. 7 shows an exemplary diagram 700 for a window-based PDCCH configuration for Redcap devices to reduce PDCCH monitoring. The first example shows an MO window configuration 705 for legacy PDCCH monitoring including five MOs. The second example shows an MO window configuration 710 for reduced PDCCH monitoring including two MOs. As shown in FIG. 7, the two MOs in the reduced monitoring configuration are aligned with the MOs in the legacy monitoring configuration.

In a fourth configuration, for Redcap devices, the maximum total number of different DCI Format sizes with C-RNTI configured to monitor is reduced from 3 (value supported in Rel-15/Rel-16) to a smaller value e.g. 2 or even 1. The total number of different DCI format sizes configured for the UE to monitor for is reduced from 4 to a smaller value e.g. 3 or 2. In some designs, a padding operation or a truncation operation may be applied to achieve this reduced number of DCI format size target.

Different PDCCH monitoring adaptation approaches can be considered as follows to switch between 'High-Power Consumption' (HPC) and 'Low-Power-Consumption' (LPC) profile PDCCH monitoring configurations based on DCI format triggering, timer-based, etc. In some designs, in step 440 in FIG. 4, the UE may be configured with at least two groups of PDCCH monitoring configurations, i.e. one group for HPC and the other for LPC, with each being associated with a group index. The exact configuration selected from the available LPC configurations is up to gNB scheduler. In the case of carrier aggregation, the CCs that UE is configured with may be divided into one or more CC groups and the PDCCH monitoring adaptation, once triggered on one cc, is applied to all CCs within a same CC group.

Figure 8:
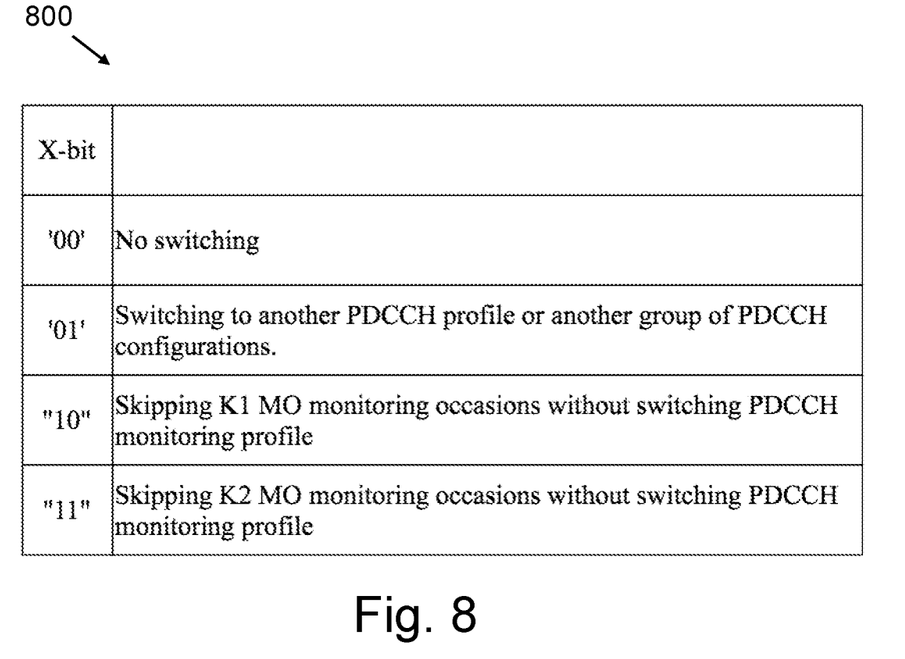
FIG. 8 shows an exemplary table for a switching scheme for reduced PDCCH monitoring according to various exemplary embodiments.

In a first approach, a DCI Format-based adaptation is used. In one design, one X-bit flag field may be added to the existing scheduling DCI formats transmitted in USS e.g. X=1 to dynamically trigger the switching between 'HPC' and 'LPC' PDCCH monitoring profiles. In addition, X=2 bits may be used to allow skipping a number of MOs without changing PDCCH monitoring profile. FIG. 8 shows an exemplary table 800 for a switching scheme for reduced PDCCH monitoring. An indication value of '00' indicates no switch from a current monitoring profile. An indication value of '01' indicates a switch from one monitoring profile to the other monitoring profile. The indication values of '10' and '11' may indicate skipping some number of MOs without changing the monitoring profile.

The UE, once configured for PDCCH monitoring, may start monitoring PDCCH according to one default PDCCH monitoring profile, e.g. 'LPC' PDCCH profile, to save power. If the UE detects that a value of the flag field in the received scheduling DCI Format is '1', the UE starts monitoring the PDCCH according to the other profile at a first slot that is at least X symbols after the last symbol of the detected scheduling DCI format.

Figure 9:
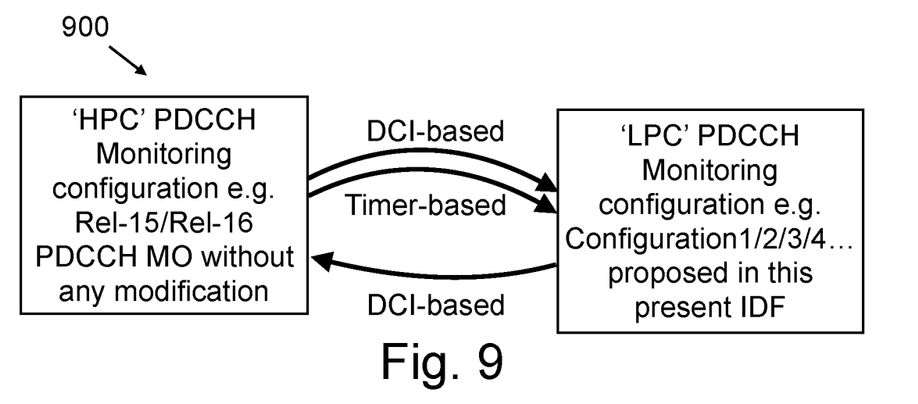
FIG. 9 shows an exemplary diagram for a switching scheme for reduced PDCCH monitoring according to various exemplary embodiments.

In a second approach, a timer-based adaptation is used. A UE may be provided a timer value and decrement the timer value by one after each reference slot. In one design, the reference slot is determined based on the smallest SCS within CCs of a CC group. In some designs, the UE resets the timer value to the value provided by higher layers once the UE starts monitoring the PDCCH according to HPC PDCCH configuration. The UE starts monitoring the PDCCH on the serving cell(s) according to the LPC PDCCH configuration and stops monitoring the PDCCH according to the HPC PDCCH configuration at the beginning of the first reference slot that is at least M symbols after the timer expires. The value of M may be reported as part of UE capability in step 420 in FIG. 4. FIG. 9 shows an exemplary diagram 900 for a switching scheme for reduced PDCCH monitoring. As shown in FIG. 9, a switch from the HPC configuration to the LPC configuration may be either DCI-based or timer-based, while a switch from the LPC configuration to the HPC configuration may be DCI-based only.

Those skilled in the art will understand that the above-described exemplary embodiments may be implemented in any suitable software or hardware configuration or combination thereof. An exemplary hardware platform for implementing the exemplary embodiments may include, for example, a desktop platform having an operating system, a mobile device having an operating system. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. One or more processors configured to perform operations comprising:
   receiving, from a user equipment (UE), a reduced physical downlink control channel (PDCCH) monitoring capability for at least one group of search space sets (SSS) of a PDCCH;
   determining a reduced monitoring capability (MO) configuration for the UE based on the reported reduced PDCCH monitoring capability,
   wherein transmitting the reduced MO configuration includes configuring first and second monitoring profiles for the UE, the first monitoring profile relating to a higher power consumption and the second monitoring profile relating to a lower power consumption, wherein the second monitoring profile includes a reduced number of blind decodes per slot relative to a reference number of blind decodes; and
   transmitting the reduced MO configuration to the UE, wherein the received reduced PDCCH monitoring capability includes reduced capabilities for a first SSS group comprising common search spaces (CSSs) and a second SSS group comprising UE-specific search spaces (USS).

2. The one or more processors of claim 1, wherein the first SSS group comprises Types 0, OA, 1 and 2 CSSs.

3. The one or more processors of claim 1, wherein the second SSS group comprises Type 3 CSS.

4. The one or more processors of claim 1, wherein the operations further comprise:
   receiving from the UE a scaling factor for a reference number of blind decodes of the PDCCH for at least one of the first SSS group or the second SSS group; and
   determining the reduced MO configuration based on the scaling factor.

5. The one or more processors of claim 1, wherein the second monitoring profile includes an increased periodicity of PDCCH monitoring.

6. The one or more processors of claim 1, wherein the second monitoring profile configuration includes an MO window configuration for reduced PDCCH monitoring.

7. The one or more processors of claim 1, wherein the second monitoring profile configuration includes a reduced number, relative to the first monitoring profile configuration, of different downlink control information (DCI) format sizes to monitor.

8. The one or more processors of claim 1, wherein the operations further comprise:
   transmitting an indication to switch from either one of the first or second monitoring profiles to the other one of the first or second monitoring profiles, wherein the indication is transmitted in a downlink control information (DCI) transmission.

9. The one or more processors of claim 1, wherein the operations further comprise:
   configuring the UE to switch from the second monitoring profile to the first monitoring profile based on a slot-based timer.

10. A base station, comprising:
    a transceiver configured to connect to a user equipment (UE); and
    one or more processors communicatively coupled to the transceiver and configured to perform operations comprising:
       receiving, from the UE, a reduced physical downlink control channel (PDCCH) monitoring capability for at least one group of search space sets (SSS) of a PDCCH;
       determining a reduced monitoring capability (MO) configuration for the UE based on the reported reduced PDCCH monitoring capability, wherein transmitting the reduced MO configuration includes configuring first and second monitoring profiles for the UE, the first monitoring profile relating to a higher power consumption and the second monitoring profile relating to a lower power consumption, wherein the second monitoring profile includes a reduced number of blind decodes per slot relative to a reference number of blind decodes; and
       transmitting the reduced MO configuration to the UE, wherein the received reduced PDCCH monitoring capability includes reduced capabilities for a first SSS group comprising common search spaces (CSSs) and a second SSS group comprising UE-specific search spaces (USS).

11. The base station of claim 10, wherein the operations further comprise:
    receiving from the UE a scaling factor for a reference number of blind decodes of the PDCCH for at least one of the first SSS group or the second SSS group; and
    determining the reduced MO configuration based on the scaling factor.

12. The base station of claim 10, wherein the second monitoring profile includes an increased periodicity of PDCCH monitoring.

13. The base station of claim 10, wherein the second monitoring profile configuration includes an MO window configuration for reduced PDCCH monitoring.

14. The base station of claim 10, wherein the second monitoring profile configuration includes a reduced number, relative to the first monitoring profile configuration, of different downlink control information (DCI) format sizes to monitor.

15. The base station of claim 10, wherein the operations further comprise:

transmitting an indication to switch from either one of the first or second monitoring profiles to the other one of the first or second monitoring profiles, wherein the indication is transmitted in a downlink control information (DCI) transmission.

16. The base station of claim 10, wherein the operations further comprise:

configuring the UE to switch from the second monitoring profile to the first monitoring profile based on a slot-based timer.

* * * * *